(12) United States Patent
Zhu et al.

(10) Patent No.: US 11,048,659 B2
(45) Date of Patent: *Jun. 29, 2021

(54) METHOD FOR INTERFACE INITIALIZATION USING BUS TURN-AROUND

(71) Applicant: Intel Corporation, Santa Clara, CA (US)

(72) Inventors: Zhenyu Zhu, Folsom, CA (US); Nobuyuki Suzuki, Portland, OR (US); Anoop Mukker, Folsom, CA (US); Daniel Nemiroff, El Dorado Hills, CA (US); David W. Vogel, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,266

(22) Filed: Jan. 22, 2019

(65) Prior Publication Data

US 2019/0391949 A1 Dec. 26, 2019
US 2020/0356518 A9 Nov. 12, 2020

Related U.S. Application Data

(63) Continuation of application No. 15/070,481, filed on Mar. 15, 2016, now Pat. No. 10,185,696.
(Continued)

(51) Int. Cl.
*G06F 13/42* (2006.01)
*G06F 1/24* (2006.01)
(Continued)

(52) U.S. Cl.
CPC ............ *G06F 13/4282* (2013.01); *G06F 1/08* (2013.01); *G06F 1/24* (2013.01); *G06F 1/3287* (2013.01); *G06F 9/4411* (2013.01)

(58) Field of Classification Search
CPC .............................. G06F 13/4282; G06F 1/24
See application file for complete search history.

(56) References Cited

U.S. PATENT DOCUMENTS 7,404,090 B1 7/2008 Lewicki et al.
10,185,696 B2 * 1/2019 Zhu ...................... G06F 9/4411
(Continued)

FOREIGN PATENT DOCUMENTS

WO 2010000624 1/2010

OTHER PUBLICATIONS

International Searching Authority, "International Search Report and Written Opinion," issued in connection with International Patent Application No. PCT/US2016/056824, dated Jan. 25, 2017, 14 pages.
(Continued)

*Primary Examiner* — Zachary K Huson
(74) *Attorney, Agent, or Firm* — Hanley, Flight & Zimmerman, LLC

(57) ABSTRACT

An example method for initializing an interface includes driving a low voltage signal on data lanes and clock lanes. The method further includes performing a reset sequence and an initialization of a link configuration register. The method also includes driving a high voltage signal to the clock lanes and the data lanes. The method further includes driving a bus turn-around (BTA) sequence on the data lanes. The method also includes detecting that the BTA is acknowledged by a host controller.

15 Claims, 4 Drawing Sheets

Related U.S. Application Data

(60) Provisional application No. 62/261,666, filed on Dec. 1, 2015.

(51) Int. Cl.
*G06F 1/08* (2006.01)
*G06F 1/3287* (2019.01)
*G06F 9/4401* (2018.01)

(56) References Cited

U.S. PATENT DOCUMENTS

| | | | |
|---|---|---|---|
| 2007/0217451 A1* | 9/2007 | Chu | H04L 7/02 |
| | | | 370/503 |
| 2009/0031065 A1* | 1/2009 | Travers | H04L 1/205 |
| | | | 710/110 |
| 2011/0013681 A1 | 1/2011 | Zou et al. | |

OTHER PUBLICATIONS

United States Patent and Trademark Office, "Notice of Allowance," issued in connection with U.S. Appl. No. 15/070,481, dated Sep. 19, 2018, 9 pages.

\* cited by examiner

METHOD FOR INTERFACE INITIALIZATION USING BUS TURN-AROUND

CROSS-REFERENCE TO RELATED APPLICATIONS

The present application claims the benefit of U.S. patent application Ser. No. 15/070,481, which is titled "METHOD FOR INTERFACE INITIALIZATION USING BUS TURN-AROUND" and was filed on Mar. 15, 2016, which claims the benefit of U.S. Provisional Patent Application Ser. No. 62/261,666 by Zhu, et al., which is titled "Method for Interface Initialization with Host as Master" and was filed on Dec. 1, 2015. The subject matter of these applications is incorporated by reference herein.

TECHNICAL FIELD

The present techniques relate generally to high bandwidth serial user interfaces, and more particularly, to an initialization method for high bandwidth serial user interfaces.

BACKGROUND ART

High bandwidth serial user interfaces are used to connect peripheral devices to computing devices. For example, peripheral devices can include touch displays and cameras, among other peripheral devices.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

As described above, high bandwidth serial user interfaces are used to connect peripheral devices to computing devices. However, mobile, tablet, and smartphone products require low power and higher performance user input interfaces. Typical input interfaces, such as camera serial interface (CSI), rely on a dedicated out-of-band control interface as an interface initialization scheme. For example, the dedicated interface may use Inter-Integrated Circuit (I2C). However, using an out-of-band control interface as an initialization scheme can use more pins, increase board routing cost, and can require software infrastructures for support.

The present techniques relate generally to techniques for initializing a high speed asymmetric interface. The techniques relate to a high speed asymmetric interface initialization scheme that can support high bandwidth performance while keeping the host processor as a master of the control interface. An example method can start from the peripheral device being master of the interface. The method can include initiating a physical layer initialization. The method can further include requesting a bus turn-around to the host processor until the bus-turn around is accepted. Once the host processor accepts the bus turn-around, the initialization is considered completed by both the host and the peripheral. The techniques can further enable an in-band control interface. Thus, the present techniques can lower system cost by avoiding the use of an additional out-of-band control interface. For example, in-band control can save costs on pin counts and board routing costs, especially in multiple port configurations. Furthermore, the techniques can provide flexibility of platform power sequencing without requiring a dedicated power/reset pin to the peripheral device. In addition, the techniques enable control information to be transmitted using MIPI DPHY low power mode, which is also very power efficient. In addition, the techniques can use the PHY's ultra-low power state (ULPS) feature to reduce power to zero between each transfer. In some embodiments, the in-band mechanism also provides faster response time on control transactions, which can result in improved user experience.

Mobile, tablet and smartphone products can require low power and higher performance user input interfaces. For example, the user input interfaces can include touch and/or camera interfaces. According to some embodiments, a new touch/camera high speed asymmetric interface initialization scheme is provided which can support the high bandwidth input performance (for example, touch finger data or camera data), while keeping the host processor as the master of the control interface.

Figure 1:
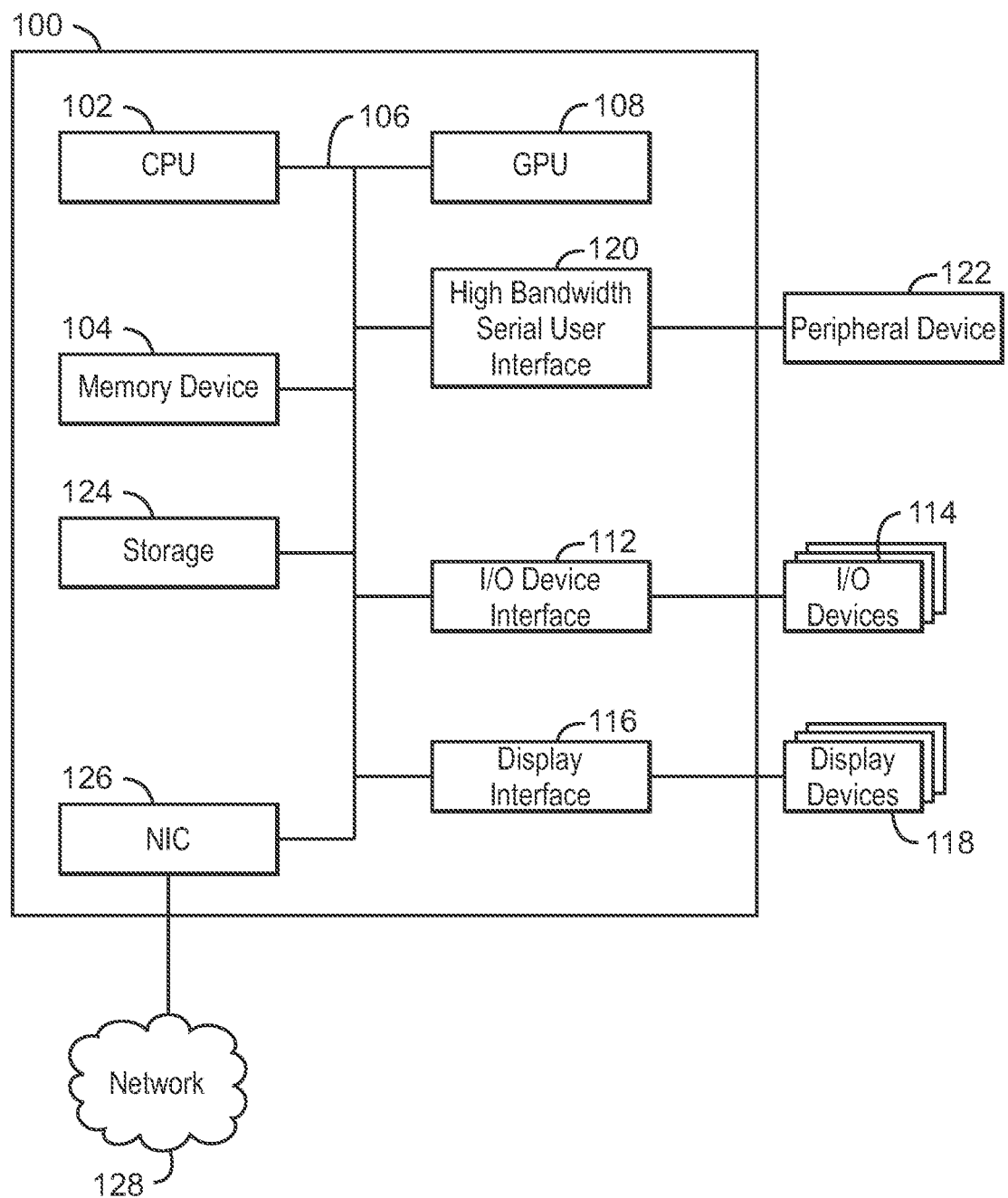
FIG. 1 is a block flow diagram of an example system that can initialize a user interface according to techniques described herein.

FIG. 1 is a block diagram illustrating an example computing device that can initialize a user interface according to techniques described herein. The computing device 100 may be, for example, a laptop computer, desktop computer, or server, among others. The computing device 100 may include a central processing unit (CPU) 102 that is configured to execute stored instructions, as well as a memory device 104 that stores instructions that are executable by the CPU 102. The CPU 102 and the memory device may be coupled to a bus 106. The CPU 102 and the memory device 104 can be coupled together via the bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 110. As shown, the CPU 102 may be coupled through the bus 106 to the GPU 110. The GPU 110 may be configured to perform any number of graphics operations within the computing device 100. For example, the GPU 110 may be configured to render or manipulate graphics images, graphics frames, videos, or the like, to be displayed to a user of the computing device 100.

The memory device 104 can include random access memory (RAM), read only memory (ROM), flash memory, or any other suitable memory systems. For example, the memory device 104 may include dynamic random access memory (DRAM).

The CPU 102 may also be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100. In some examples, the memory 104 may be communicatively coupled to I/O devices 114 through direct memory access (DMA).

The CPU 102 may also be linked through the bus 106 to a display interface 116 configured to connect the computing device 100 to a display device 118. The display device 118 may include a display screen that is a built-in component of the computing device 100. The display device 118 may also include a computer monitor, television, or projector, among others, that is internal to or externally connected to the computing device 100.

The CPU 102 may also be linked through the bus 106 to a high bandwidth serial user interface 120 configured to connect the computing device 100 to a peripheral device 122. For example, the peripheral device can be a touch screen display or a camera, among other high bandwidth peripheral devices. In some examples, the high bandwidth serial user interface 120 can be bidirectional and/or duplex. For example, the high bandwidth serial user interface 120 can support a low power state on both a clock lane and a data lane. For example, the lower power state can be an ultra-low power state (ULPS) to be used between data transfers.

The computing device also includes a storage device 124. The storage device 124 is a physical memory such as a hard drive, an optical drive, a thumbdrive, an array of drives, or any combinations thereof. The storage device 124 may also include remote storage drives.

The computing device 100 may also include a network interface controller (NIC) 126. The NIC 126 may be configured to connect the computing device 100 through the bus 106 to a network 128. The network 128 may be a wide area network (WAN), local area network (LAN), or the Internet, among others. In some examples, the device may communicate with other devices through a wireless technology. For example, Bluetooth® or similar technology may be used to connect with other devices.

The block diagram of FIG. 1 is not intended to indicate that the computing device 100 is to include all of the components shown in FIG. 1. Rather, the computing system 100 can include fewer or additional components not illustrated in FIG. 1, such as sensors, power management integrated circuits, additional network interfaces, additional peripheral devices, and the like. The computing device 100 may include any number of additional components not shown in FIG. 1, depending on the details of the specific implementation.

Figure 2:
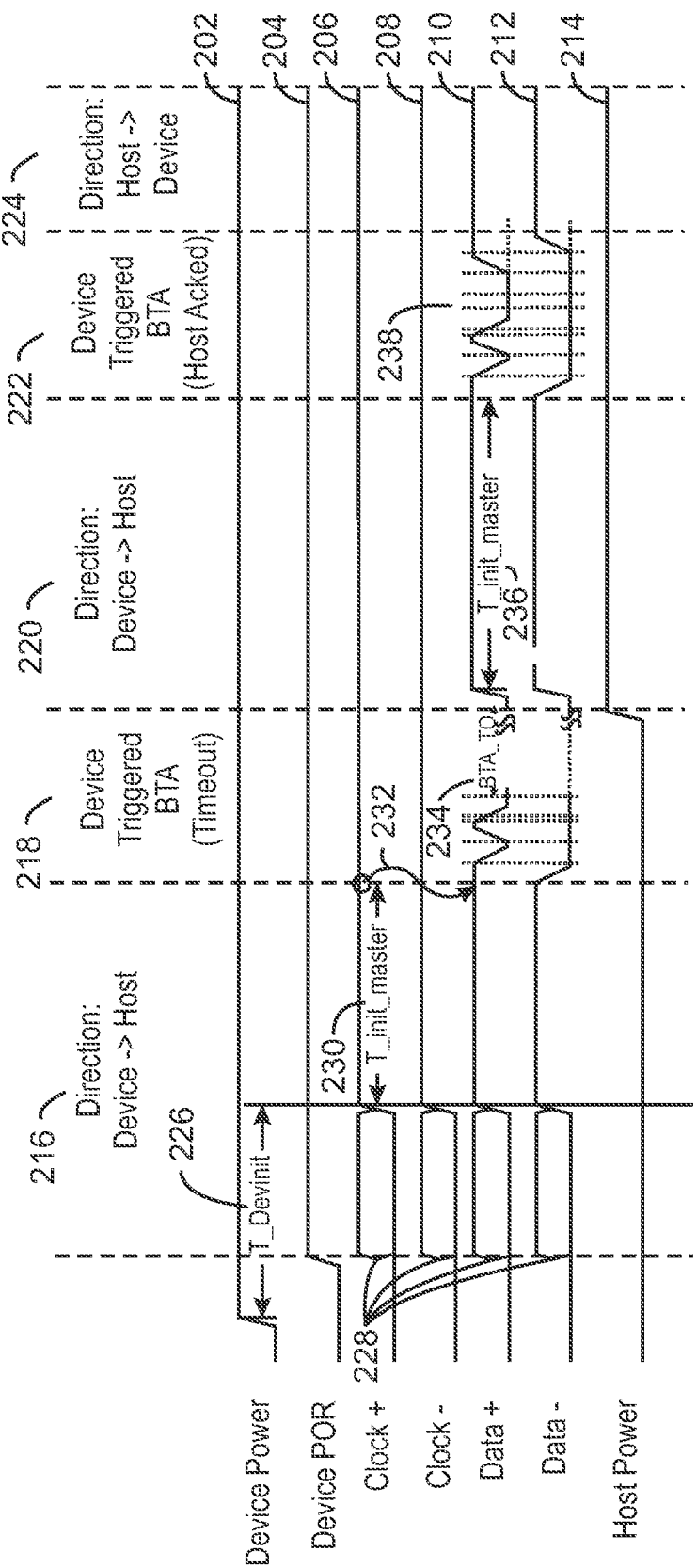
FIG. 2 is a system flow diagram of an example system that can be used to initialize a user interface.

FIG. 2 is a system flow diagram of an example initialization sequence that can be used to initialize a user interface. The example system is generally referred to by the reference number 200.

The example initialization sequence 200 includes seven lanes, including a device power lane 202, a device power on reset (POR) lane 204, a positive clock lane 206, a negative clock lane 208, a positive data lane 212, and a negative data lane 204. The example initialization sequence 200 further include five consecutive events. At 216, a device is transmitting to a host. For example, the device can be the peripheral device of FIG. 1 above. At 218, the device triggers a bus turn-around (BTA) that results in a timeout. At 220, the device transmits to the host again. At 224, the host begins transmitting to the device.

In FIG. 2, the example initialization sequence 200 may begin with an initialization command $T_{devinit}$ being sent by the device to the host via the device power lane 202. Out of reset, the device can be the master from the PHY's perspective and can thus be said to own the clock lanes 206, 208 and data lanes 210, 212 initially. The device can drive an LP_00 command on both data lanes 206, 208 and clock lanes 210, 212 by default out of reset. As indicated by blocks 228, the device does not drive any STOP11 commands on the clock lanes 206, 208 or the data lanes 210, 212 during the period 226. After the device completes reset sequences and initialization of the link configuration registers, the device can begin the initialization process by driving a STOP-11 state to both clock and data lanes for $T_{init\_master}$ 230. As indicated by an arrow 232, after the $T_{init\_master}$ 230 command the device can drive a bus turn-around (BTA) 234 on the data lanes 210, 212. In the example initialization sequence 200, the first BTA 234 results in a timeout $T_{BTA\_TO}$. If the turn-around sequence is not acknowledged by the host, and after $T_{BTA\_TO}$, the device can drive STOP-11 again on the data lane for $T_{init\_master}$. In some examples, the device can drive STOP-11 until the sequence completes. If the data lane BTA sequence is acknowledged by the host controller as indicated at 238, the initialization sequence completes. In some examples, after the TSI host controller is out of reset, the host controller can default to disabling BTA for both clock and data lanes.

The diagram of FIG. 2 is not intended to indicate that the example initialization sequence 200 is to include all of the components shown in FIG. 2. Further, the example initialization sequence 200 may include any number of additional components not shown in FIG. 2, depending on the details of the specific implementation. For example, the example initialization sequence 200 may include additional BTAs, among other additional components.

Figure 3:
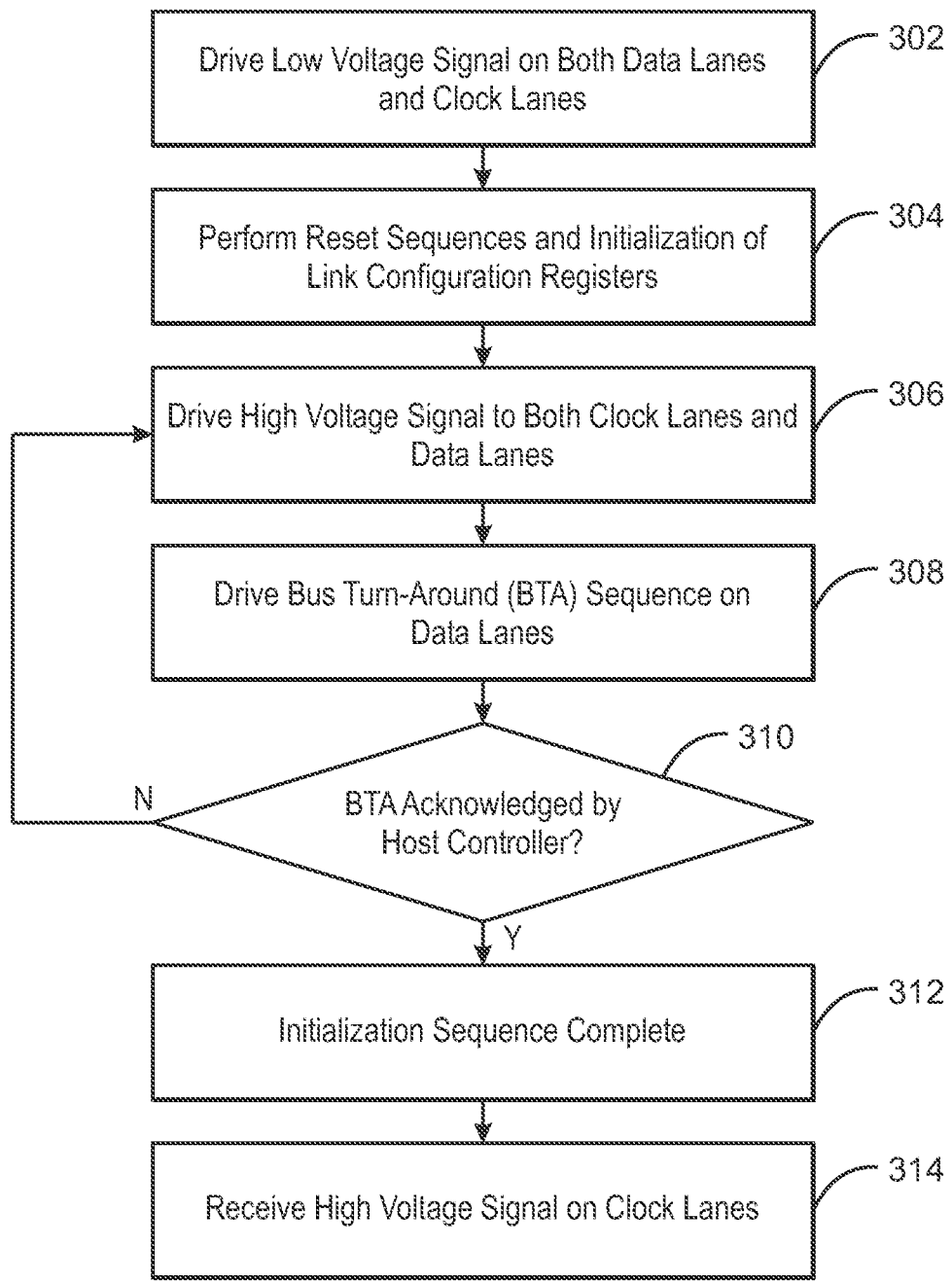
FIG. 3 is a block flow diagram of method for initializing a user interface.

FIG. 3 is a block flow diagram of an example method for initializing a user interface. The example method is generally referred to by the reference number 300. The example method 300 can be implemented by the peripheral device 122 via the high bandwidth serial user interface 120 of the example system 100 of FIG. 1 above.

At block 302, the peripheral device drives low voltage signal on both data lanes and clock lanes. For example, out of reset, the peripheral device can be the master from the physical layer's (PHY) perspective and owns the clock and data lane initially. In some examples, the peripheral device can drive an LP_00 signal on both data and clock lane by default out of reset.

At block 304, the peripheral device performs reset sequences and an initialization of link configuration registers. In some examples, the peripheral device does not drive STOP-11 on the data or clock lane before performing the reset sequences and initialization of link configuration registers.

At block 306, the peripheral device drives a high voltage signal to both clock lanes and data lanes. For example, the peripheral device can start the initialization sequence by driving STOP-11 state to both clock and data lanes for $T_{init\_master}$. In some examples, the peripheral device can start the initialization sequence after a core power is detected.

At block 308, the peripheral device drives a bus turn-around (BTA) sequence on the data lanes. In some examples, the peripheral device may continuously drive BTA sequences on the data lanes until the BTA is acknowledge by the host controller.

At block 310, the peripheral device determines whether the BTA is acknowledged by host controller. If the peripheral device detects that the BTA is acknowledged by the host controller, then the method may proceed at block 312. If the peripheral device detects that the BTA is not acknowledged by the host controller, then the method may proceed back to block 306.

At block 312, the peripheral device detects that the initialization sequence is complete. For example, the peripheral device may detect the initialization sequence is complete in response to detecting that the BTA was acknowledged by the host controller.

At block 314, the peripheral device receives a high voltage signal on the clock lanes. For example, the high voltage signal can be a STOP-11 state.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
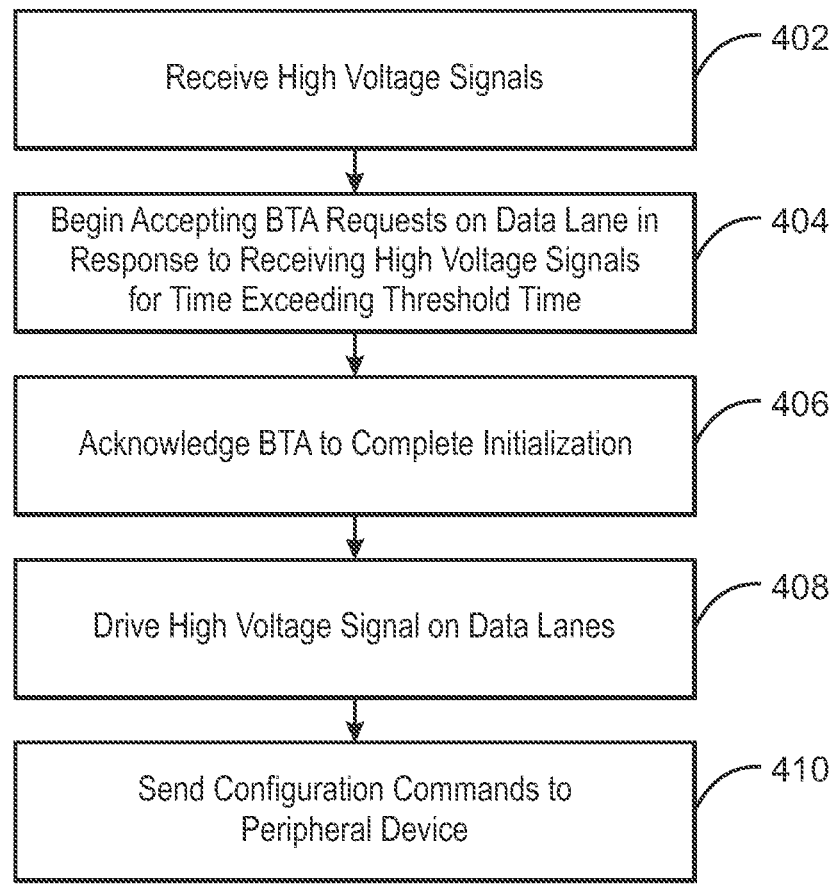
FIG. 4 is another block flow diagram of method for initializing a user interface.

FIG. 4 is a block flow diagram of another example method for initializing a user interface. The example method is generally referred to by the reference number 400. The example method 400 can be implemented by the example computing device 100 acting as a host via the high bandwidth serial user interface 120 of FIG. 1 above.

At block 402, the host receives high voltage signals. For example, out of a reset, the host controller's data lane can be in receiver mode initially. In some examples, out of a reset, the host controller can default to have turn-around disabled for both clock and data lanes. In some examples, after the host controller completes controller and PHY initialization, the host enables the PHY and forces the data lane into receiver mode immediately. The host can then begin monitoring the low power receiver (LP-RX) for stop states. For example, the stop states can include a STOP-11 state.

At block 404, the host begins accepting for BTA requests on data lane in response to receiving high voltage signals for time exceeding threshold time. For example, if the host controller receives a continuous STOP-11 state for longer than $T_{init\text{-}slave}$, the host can start accepting the turn-around request on data lane from the peripheral device. In some examples, the peripheral device can continue driving clock lane to STOP-11 during the initialization until the bus turn-around on the data lane is completed. In some examples, during initialization, the host can send Get Maximum HS/LPDT packets size commands to read the peripheral device's supported maximum packet sizes. The host can then send the Set a Maximum HS/LPDT packet size to the peripheral device with a maximum packet size (MPS) which is compatible with both the host and the peripheral device. Furthermore, in some examples, the host can send the Set HS-CLK rate packet to the peripheral device to program the high-speed (HS) clock frequency for HS operation.

At block 406, the host acknowledges BTA to complete initialization. For example, after the turn-around handshaking completes successfully and the direction of the data lane switches from peripheral device to host, the initialization is completed. In some examples, the port connected bit Current Connect Status can be set. In some examples, an interrupt can be sent to software if the port connect interrupt enable is set. In some examples, two conditions can be met to set the connected bit. First, a clock lane can observed at STOP-11 for longer than a threshold time. For example, the threshold time can be $T_{init}$+GB. Second, the data lane is successfully turned around to the host (indicated by a direction=0). For example, the data lane may have observed STOP-11 before the data lane allowed a turn-around as indicated by turndisable=0.

At block 408, the host drives high voltage signals on the data lanes. For example, after the initialization sequence is completed, the host can drive STOP-11 on the data lanes.

At block 410, the host sends configuration commands to the peripheral device. For example, after the interface link is connected, the host can send the configuration commands to the peripheral device in low power (LP) mode with a default LP Max Packet Size of 64 Bytes.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

EXAMPLES

Example 1 is a method for initializing an interface. The method includes driving a low voltage signal on data lanes and clock lanes. The method includes performing a reset sequence and an initialization of a link configuration register. The method includes driving a high voltage signal to the clock lanes and the data lanes. The method includes driving a bus turn-around (BTA) sequence on the data lanes. The method includes detecting that the BTA is acknowledged by a host controller.

Example 2 includes the method of example 1, including or excluding optional features. In this example, the method includes driving, via the host controller, a high voltage signal on the clock lanes in response to detecting that the BTA is acknowledged by the host controller.

Example 3 includes the method of any one of examples 1 to 2, including or excluding optional features. In this example, driving the low voltage signal is performed by a peripheral device in response to a reset.

Example 4 includes the method of any one of examples 1 to 3, including or excluding optional features. In this example, the method includes starting the initialization after a core power is detected.

Example 5 includes the method of any one of examples 1 to 4, including or excluding optional features. In this example, the BTA is continuously driven until the BTA is acknowledge by the host controller.

Example 6 includes the method of any one of examples 1 to 5, including or excluding optional features. In this example, the method includes detecting that the BTA is not acknowledged by the host controller and driving the high voltage signal to the clock lanes and the data lanes until the BTA is detected as acknowledged by the host controller.

Example 7 includes the method of any one of examples 1 to 6, including or excluding optional features. In this example, the method includes detecting the initialization sequence is complete in response to detecting that the BTA was acknowledged by the host controller.

Example 8 includes the method of any one of examples 1 to 7, including or excluding optional features. In this example, the high voltage signal includes a stop state.

Example 9 includes the method of any one of examples 1 to 8, including or excluding optional features. In this example, the low voltage signal and the high voltage signal is driven by a peripheral device including a touch device.

Example 10 includes the method of any one of examples 1 to 9, including or excluding optional features. In this example, the low voltage signal and the high voltage signal is driven by a peripheral device including a camera device.

Example 11 is a method for initializing an interface. The method includes receiving high voltage signals at a host device from a peripheral device. The method includes accepting bus turn-around requests on a data lane at the host device in response to receiving the high voltage signals for a time exceeding a threshold time. The method includes acknowledging the bus turn-around requests to complete an initialization. The method includes driving, via the host device, a second set of high voltage signals on the data lane.

Example 12 includes the method of example 11, including or excluding optional features. In this example, the method includes sending configuration commands to the peripheral device.

Example 13 includes the method of any one of examples 11 to 12, including or excluding optional features. In this example, the method includes defaulting to a disabled turn-around for the data lane in response to a reset.

Example 14 includes the method of any one of examples 11 to 13, including or excluding optional features. In this example, the method includes enabling a physical layer (PHY) and forcing the data lane into a receiver mode in response to completing the initialization.

Example 15 includes the method of any one of examples 11 to 14, including or excluding optional features. In this example, the method includes sending a set rate packet to the peripheral device to program a high-speed clock frequency for high-speed operation.

Example 16 includes the method of any one of examples 11 to 15, including or excluding optional features. In this example, the method includes monitoring a lower power receiver for stop states.

Example 17 includes the method of any one of examples 11 to 16, including or excluding optional features. In this example, the method includes continue driving clock lane to STOP-11 during the initialization until the bus turn-around on the data lane is completed.

Example 18 includes the method of any one of examples 11 to 17, including or excluding optional features. In this example, the method includes sending a get maximum packets size command to receive the peripheral device's supported maximum packet sizes and sending packet size setting to the peripheral device with a maximum packet size (MPS), wherein the MPS is compatible with both the host device and the peripheral device.

Example 19 includes the method of any one of examples 11 to 18, including or excluding optional features. In this example, the method includes setting a connected bit in response to detecting that both a clock lane is observed at STOP-11 for a time exceeding a threshold time and detecting that the data lane has been successfully turned-around.

Example 20 includes the method of any one of examples 11 to 19, including or excluding optional features. In this example, the method includes sending configuration commands to the peripheral device in a low power (LP) mode with a default LP Max Packet Size of 64 Bytes.

Example 21 is a device interface. The device includes a device power lane to receive a high voltage signal from a peripheral device to begin an initialization. The device includes a data lane to receive a bus turn-around request from the peripheral device and send the bus-turn around request to the host device. The data lane is to also receive a bus turn-around acknowledgement from a host device and send the bus turn-around acknowledgment to the peripheral device. The data lane is to further receive data from the host device.

Example 22 includes the device of example 21, including or excluding optional features. In this example, the device interface includes a bidirectional high-bandwidth serial user interface.

Example 23 includes the device of any one of examples 21 to 22, including or excluding optional features. In this example, the device interface includes a duplex high-bandwidth serial user interface.

Example 24 includes the device of any one of examples 21 to 23, including or excluding optional features. In this example, the device includes a power on reset lane to be used to reset the user interface in response to receiving a reset voltage.

Example 25 includes the device of any one of examples 21 to 24, including or excluding optional features. In this example, the device includes a host power lane to receive power in response to sending the bus turn-around request.

Example 26 includes the device of any one of examples 21 to 25, including or excluding optional features. In this example, the device interface is to use ultra-low power states on the data lane for sending control information between data transfers.

Example 27 includes the device of any one of examples 21 to 26, including or excluding optional features. In this example, the bus turn-around acknowledgement indicates the completion of the initialization.

Example 28 includes the device of any one of examples 21 to 27, including or excluding optional features. In this example, the data lane is to further receive a set rate packet from the host device and send the set rate packet to the peripheral device to program a high-speed clock frequency for high-speed operation.

Example 29 includes the device of any one of examples 21 to 28, including or excluding optional features. In this example, the device includes a clock lane to be monitored for a STOP-11 mode and the user interface is to further set a connected bit if the STOP-11 mode is detected at the clock lane for a period exceeding a threshold time and the data lane is detected as turned-around to the host device.

Example 30 includes the device of any one of examples 21 to 29, including or excluding optional features. In this example, the device includes receiving configuration commands from the host device in a low power mode and sending the configuration commands to the peripheral device.

Example 31 is a system for initializing a device interface. The system includes a high-bandwidth serial user interface further including a device power lane to receive a high voltage signal from a peripheral device to begin an initialization. The high-bandwidth serial user interface further includes a data lane to receive a bus turn-around request from the peripheral device and send the bus-turn around request to the host device. The data lane is to also receive a bus turn-around acknowledgement from a host device and send the bus turn-around acknowledgment to the peripheral device. The data lane is to further receive data from the host device.

Example 32 includes the system of example 31, including or excluding optional features. In this example, the peripheral device includes a touch screen display.

Example 33 includes the system of any one of examples 31 to 32, including or excluding optional features. In this example, the peripheral device includes a camera.

Example 34 includes the system of any one of examples 31 to 33, including or excluding optional features. In this example, the high-bandwidth serial user interface includes a duplex interface.

Example 35 includes the system of any one of examples 31 to 34, including or excluding optional features. In this example, the high-bandwidth serial user interface includes a bidirectional interface.

Example 36 includes the system of any one of examples 31 to 35, including or excluding optional features. In this example, the system includes a power on reset lane to be used to reset the user interface in response to receiving a reset voltage.

Example 37 includes the system of any one of examples 31 to 36, including or excluding optional features. In this example, the system includes a host power lane to receive power in response to sending the bus turn-around request.

Example 38 includes the system of any one of examples 31 to 37, including or excluding optional features. In this example, ultra-low power states on the data lane are to be used for sending control information between data transfers.

Example 39 includes the system of any one of examples 31 to 38, including or excluding optional features. In this example, the bus turn-around acknowledgement indicates the completion of the initialization.

Example 40 includes the system of any one of examples 31 to 39, including or excluding optional features. In this example, the data lane is to further receive a set rate packet from the host device and send the set rate packet to the peripheral device to program a high-speed clock frequency for high-speed operation.

Example 41 is a system for initializing a device interface. The system includes means for sending data between a peripheral device and a host device, further including means for receiving a high voltage signal from a peripheral device to begin an initialization. The system also includes means for receiving a bus turn-around request from the peripheral device and send the bus-turn around request to the host device. The system further includes means for receiving a bus turn-around acknowledgement from a host device and send the bus turn-around acknowledgment to the peripheral device. The system also includes and means for receiving data from the host device.

Example 42 includes the system of example 41, including or excluding optional features. In this example, the peripheral device includes a touch screen display.

Example 43 includes the system of any one of examples 41 to 42, including or excluding optional features. In this example, the peripheral device includes a camera.

Example 44 includes the system of any one of examples 41 to 43, including or excluding optional features. In this example, the means for sending data between a peripheral device and a host device includes a duplex interface.

Example 45 includes the system of any one of examples 41 to 44, including or excluding optional features. In this example, the means for sending data between a peripheral device and a host device includes a bidirectional interface.

Example 46 includes the system of any one of examples 41 to 45, including or excluding optional features. In this example, the system includes means for resetting the user interface in response to receiving a reset voltage.

Example 47 includes the system of any one of examples 41 to 46, including or excluding optional features. In this example, the system includes a means for receiving power in response to sending the bus turn-around request.

Example 48 includes the system of any one of examples 41 to 47, including or excluding optional features. In this example, ultra-low power states on the data lane are to be used for sending control information between data transfers.

Example 49 includes the system of any one of examples 41 to 48, including or excluding optional features. In this example, the bus turn-around acknowledgement indicates the completion of the initialization.

Example 50 includes the system of any one of examples 41 to 49, including or excluding optional features. In this example, the data lane is to further receive a set rate packet from the host device and send the set rate packet to the peripheral device to program a high-speed clock frequency for high-speed operation.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus to initialize an interface, comprising:
a device power lane to receive a first voltage level; and
a data lane to:
receive a bus turn-around (BTA) sequence after the first voltage level;
send a BTA acknowledgement in response to the BTA sequence; and
send a configuration command to a peripheral device after the interface is initialized based on the BTA acknowledgement.

2. The apparatus of claim 1, wherein the data lane is to receive the BTA sequence after the first voltage level is held a threshold time.

3. The apparatus of claim 1, wherein the first voltage level is from the peripheral device.

4. The apparatus of claim 1, wherein the data lane is to send the configuration command in low power (LP) mode with a default LP maximum packet size of 64 bytes.

5. The apparatus of claim 1, wherein the peripheral device is a touch screen device.

6. A computer-readable storage device comprising instructions to initialize an interface, the instructions, when executed, to cause circuitry to at least:
detect a bus turn-around (BTA) sequence on a data lane after a first voltage level is applied on a device power lane;
send a BTA acknowledgement on the data lane in response to the BTA sequence; and
send a configuration command on the data lane to a peripheral device after the interface is initialized based on the BTA acknowledgement.

7. The computer-readable storage device of claim 6, wherein the instructions are to cause the circuitry to receive the BTA sequence after the first voltage level is held a threshold time.

8. The computer-readable storage device of claim 6, wherein the first voltage level is from the peripheral device.

9. The computer-readable storage device of claim 6, wherein the instructions are to cause the circuitry to send the configuration command on the data lane in low power (LP) mode with a default LP maximum packet size of 64 bytes.

10. The computer-readable storage device of claim 6, wherein the peripheral device is a touch screen device.

11. A method to initialize an interface, comprising:
after a first voltage level on a device power lane, detecting a bus turn-around (BTA) sequence on a data lane;
sending a BTA acknowledgement on the data lane in response to the BTA sequence; and
sending a configuration command on the data lane to a peripheral device after the interface is initialized based on the BTA acknowledgement.

12. The method as defined in claim 11, wherein the BTA sequence is on the data lane after the first voltage level is held a threshold time.

13. The method as defined in claim 11, wherein the first voltage level is from the peripheral device.

14. The method as defined in claim 11, wherein the sending of the configuration command is in low power (LP) mode with a default LP maximum packet size of 64 bytes.

15. The method as defined in claim 11, wherein the peripheral device is a touch screen device.

* * * * *